Jan. 13, 1970 J. L. A. HAUCHART 3,490,012

MAGNETIC CORE MEMORY PLANE WITH SEVERAL CORE QUADRANTS

Filed Oct. 26, 1966 3 Sheets-Sheet 1

Inventor:
Jean Lucien Alexandre Hauchart
By Baldwin, Wight, Diller & Brown
Attorneys Inventor:
Jean Lucien Alexandre Hauchart
BY Baldwin, Wight, Diller & Brown
Attorneys

MAGNETIC CORE MEMORY PLANE WITH SEVERAL CORE QUADRANTS

Filed Oct. 26, 1966 3 Sheets-Sheet 3

Inventor:
Jean Lucien Alexandre Hauchart
By Baldwin, Wight, Diller & Brown
Attorneys 3,490,012
Patented Jan. 13, 1970

3,490,012

MAGNETIC CORE MEMORY PLANE WITH SEVERAL CORE QUADRANTS

Jean Lucien Alexandre Hauchart, Noisy-le-Sec, France, assignor to Societe Industrielle Bull-General Electric (Societe Anonyme), Paris, France Filed Oct. 26, 1966, Ser. No. 589,620
Claims priority, application France, Nov. 6, 1965, 37,552
Int. Cl. G11b 5/00
U.S. Cl. 340—174 6 Claims

ABSTRACT OF THE DISCLOSURE

In a magnetic core matrix plane, wherein the cores are separated in at least four sections or quadrants, each of four separated sense windings is threaded into the cores according to a bifilar configuration and in such a manner that a winding covers half the cores of a quadrant in each of two diagonally opposed quadrants, so that the signal-to-noise ratio is improved by a factor of two. Another reduction of the disturbance of the read-out signals by the inhibiting or Z windings results from the fact that each Z winding is threaded in two quadrants which are not diagonally opposed.

Figure 1A:
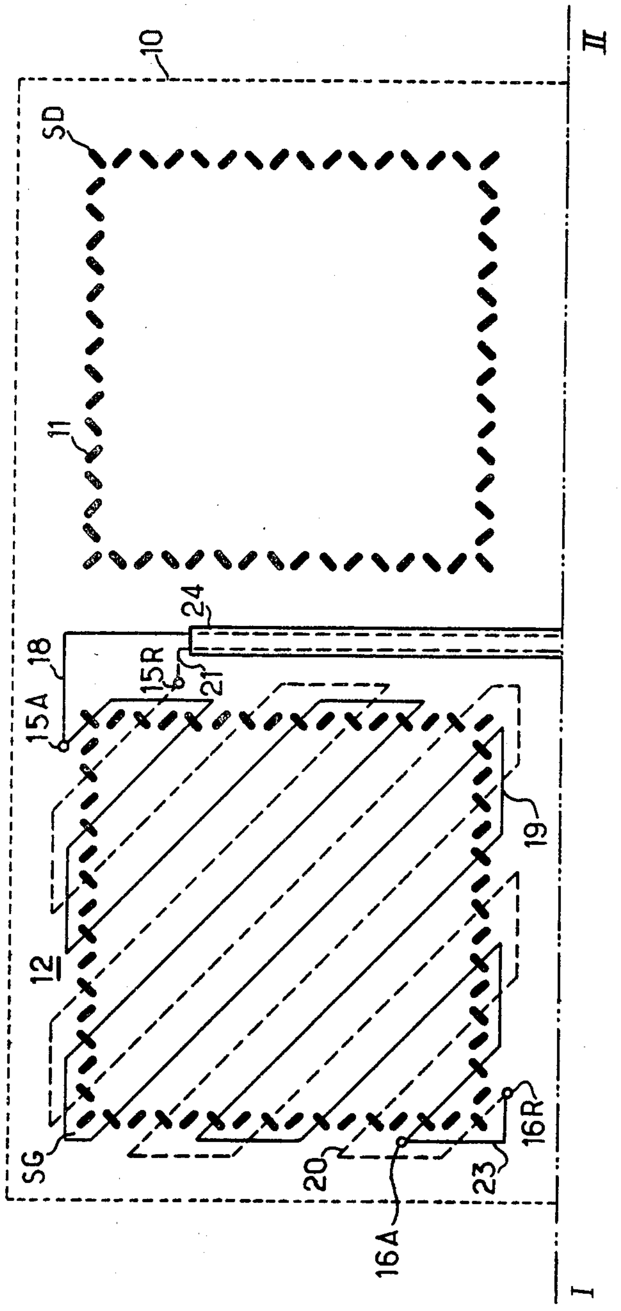

This invention relates to general information-storage devices called "magnetic-core memories" and is concerned more particularly with a novel structure for such memories, which improves the performance of the latter.

Many problems which are difficult to resolve arise out of the necessity to construct very rapidly operating memory systems having a high storage capacity.

It is known that a memory system comprising magnetic cores having a substantially rectangular hysteresis loop generally consists of a number of memory planes stacked side-by-side, and arranged to form a three-dimensional matrix memory. Each memory plane is formed of an arrangement of toroidal cores disposed in, for example, horizontal lines or rows and in, for example, vertical columns.

Each toroidal core is conventionally traversed by four conductors, i.e., an X conductor and a Y conductor for effecting the selection of a particular core by coincidence of currents, either during the writing or during the extraction of an element of information, an inhibiting conductor common to all the cores of one plane, which may or may not be energised during the writing, and finally a reading conductor forming part of a reading output winding for this plane.

The difficulties encountered in processing data very rapidly in such a memory system are due to parasitic signals or noise occurring at the terminals of the reading output windings, which parasitic signals or noise may cause errors in the identification of the data which are read, or may form an obstacle to high-speed operation.

Acceptable compensation for noise due to the semi-selected cores has long been obtained by arranging the cores in two directions of orientation in groups of four and threading the reading winding along diagonal paths with successive reversals of the sense of traversal of the tores.

In the case of high-capacity high-speed memories employed with a memory cycle of one microsecond or less, the time of propagation along the reading winding is no longer negligible in relation to the duration of the parasitic signals. It was therefore desirable to treat the reading winding as a transmission line and to try and arrange that the different noise signals arrive as far as possible in phase at the ends of the reading winding, which are connected to a differential amplifier. It has therefore been proposed to give the reading winding a "bifilar" structure, which is characterised by the fact that its "outgoing" and "return" conductors extend constantly in parallel relationship along diagonals relatively close together.

On the other hand, in the case of memory planes comprising a very large number of magnetic cores, an arrangement has been proposed in which a rectangular or square matrix is divided into a number of sections, for example into four equal quadrants. Since there are a number of separate reading windings and a number of separate inhibiting windings (or Z windings), the number of cores through which each of these windings extends is greatly reduced, and this limits the low-pass filter effects which produce the increase of the duration of the useful signals and their propagation time along the reading conductor. By reason of the reduction of the number of couplings of each reading winding, on the one hand to the active X and Y wires and on the other hand to the active Z winding, the advantage of a reduction of the amplitude of the noises due to the inductive and capacitive couplings is enjoyed.

An object of the invention is to provide a particular structure of a memory plane as defined above, with which there is obtained a further reduction of the amplitude of the noise signals, owing to the fact that each reading winding is so arranged that it only passes at most through half the cores subjected to disturbance during a selection by coincident currents.

Another object of the invention is to provide a particular structure of a memory plane as hereinbefore defined with which there is obtained a further reduction of the noise due to the couplings to the Z winding, by providing a particular threading for the latter.

Accordingly, in accordance with the invention, in a memory plane composed of toroidal storage cores arranged in N rows and $n$ columns, but separated into an even number P of sections or "quadrants," P being at least equal to four, with N row selection wires and $n$ column selection wires, P separate inhibiting (Z) windings and P separate reading windings, the latter being diagonally threaded on the bifilar mode and each treated as a transmission line, the bifilar element of each of the reading windings extends in zigzag form through half the cores of two diagonally opposed quadrants, following one diagonal direction in one quadrant and a different diagonal direction in the second of the two quadrants under consideration.

Another advantage resulting from the application of the invention is that, where there are only four sense or reading windings, they are threaded in exactly the same way.

Another feature of the invention is that, for each plane, each Z winding which zigzags through the $Nxn/P$ cores of the plane passes through those situated in two neighbouring quadrants, i.e. not diagonally.

Although the division of the memory plane is preferably effected with P=4 division by 6 or 8 is also possible. In addition, each section is not necessarily square, but may also be of rectangular form.

Figure 1B:
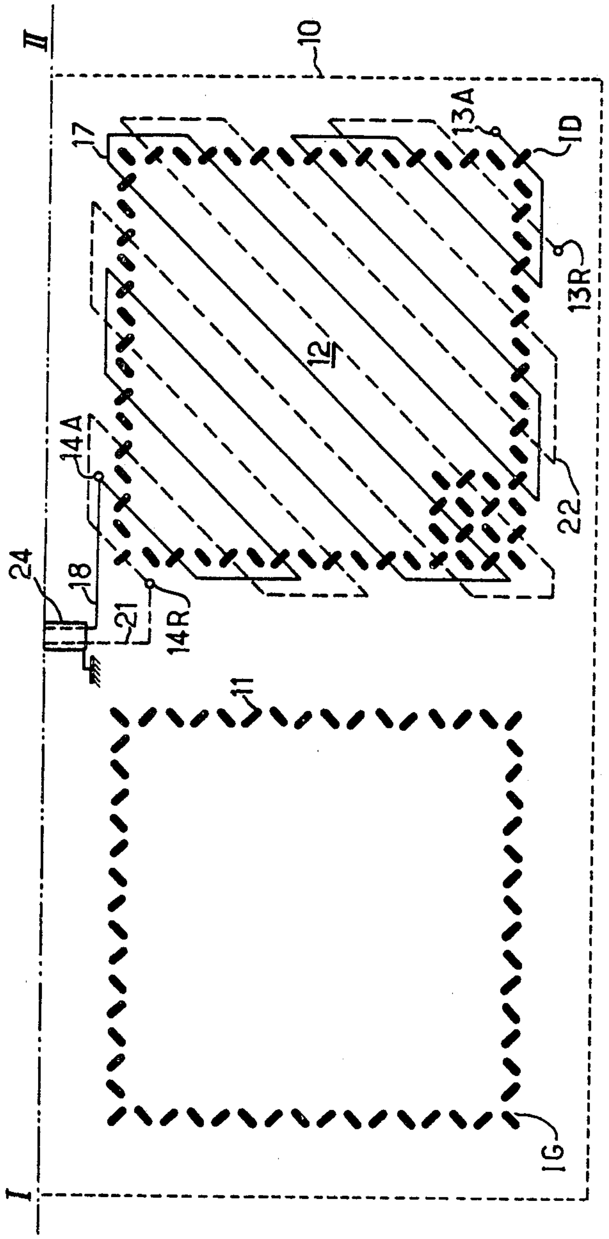
Figure 4:
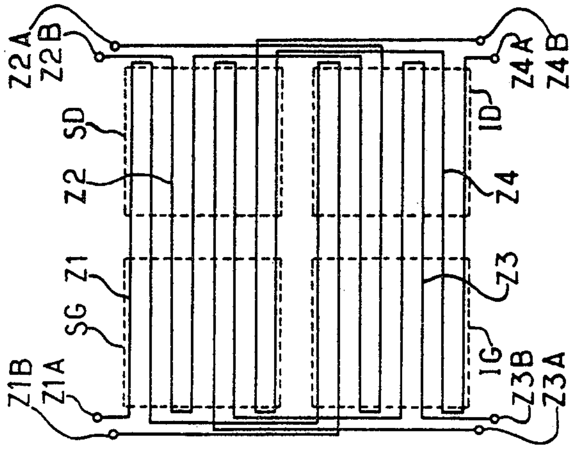
Figure 3:
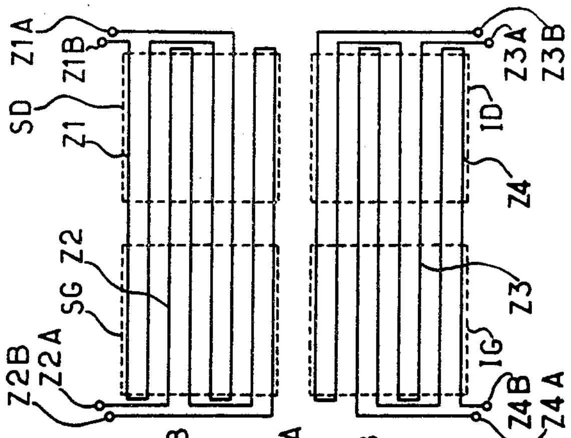
Figure 2:
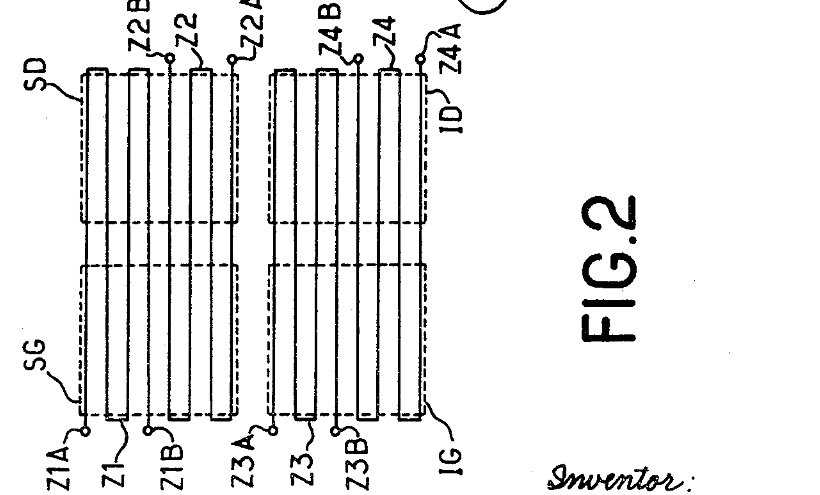

For a better understanding of the invention and to show how it may be carried into effect, embodiments thereof will now be described, by way of example, with reference to the accompanying drawings, in which:

FIGURES 1A and 1B (to be assembled along the lines I and II) is a diagram of a magnetic-core memory plane according to the invention, and FIGURES 2, 3 and 4 are diagrams illustrating a number of possible constructions of the inhibiting windings of a memory plane.

The invention is applicable above all to a large-capacity matrix memory whose memory cycle is very short. For example, there may be considered a three-dimensional toroidal core memory composed of 36 memory planes, each memory plane consisting of 16,384 cores arranged in 128 rows and 128 columns. The memory cycle time, including a phase called the "reading" phase and a phase called the "writing" phase, may be, for example, of one microsecond or even less.

FIGURES 1A and 1B, assembled along the dash-dotted lines I and II, represents a memory plane 10 of very much smaller capacity in order to reduce the size and the complexity of the drawings. This does not in any way change the validity of the explanations which will be given.

In the present instance, the memory plane 10 is shown as containing 1024 toroidal magnetic cores 11 assumed to be seen in profile. These cores or tores 11 are distributed in four sections or quadrants and denoted by SG (upper left), SD (upper right), IG (lower left) and ID (lower right). Each quadrant is therefore composed of 256 cores arranged in 16 horizontal rows and 16 vertical columns. Only the cores situated on the edges of the quadrants have been fully shown. By virtue of its overall operation and its addressing mode, this memory plane is equivalent to a matrix having a N=32 rows and $n$=32 columns.

As is well known, such a memory plane comprises, for each row, a Y conductor threaded into the 32 cores of two quadrants situated side-by-side and for each column an X conductor threaded into the 32 cores of two quadrants situated one above the other. Since these conductors are well known, they have been omitted from the figures in order not to impair the clarity of the drawings. It has also been unnecessary to show all the switching devices and generators which are necessary for the selective energisation of the various conductors and windings, but which do not form part of the invention.

Likewise, the four inhibiting windings or Z windings, are not shown in FIGURES 1A and 1B, because the various possible constructions thereof will be considered with reference to FIGURES 2 to 4. Nevertheless, it may be assumed for the moment that in each quadrant the 256 cores could be traversed by a zigzagging Z winding either in a horizontal direction or in a vertical direction, in the well known manner.

In FIGURES 1A and 1B, there may be completely seen a reading winding 12 threaded in accordance with the invention. The reading winding 12 is composed of an "outgoing" wire represented by a solid lines and extending from the terminal 13A, and of a "return" wire represented by a chain line, which terminates at the terminal 13R, in a corner of the quadrant ID. For convenience in the threading, each "outgoing" or "return" wire is composed of a number of soldered wire sections. Thus, the "outgoing" wire comprises a wire 17, a connecting wire 18 extending from the terminal 14A (FIGURE 1B) to the terminal 15A (FIGURE 1A), and a wire 19 which terminates at the terminal 16A. The "return" wire comprises a wire 20 beginning at the terminal 16R, a connecting wire 21 between the terminals 15R and 14R, and a wire 22 terminating at the terminal 13R. A junction wire 23 closes the circuit by connecting the terminals 16A and 16R. The greater part of the wires 18, 21 is enclosed in a conductive screen 24 connected to the earth of the apparatus.

It will be noted that in the quadrant ID the wires 17 and 22 extend through one half the tores in a common direction parallel to the diagonal IG–SD. In the quadrant SG, the wires 19 and 20 also extend through one half of the cores, but in a direction parallel to the diagonal SG–ID.

The outgoing and return wires constitute a bifilar element which provides reduced loop surfaces and a very satisfactory symmetry of the locations of the cores in relation of the ends of the reading winding. It is known that this symmetry cannot be perfect and that the differences of electrical length are maximum when the undesirable couplings occur in the central region of a quadrant. However, even in this case, if a high-capacity matrix is considered, the phase difference affecting the noise pulses, which should arrive simultaneously at the ends of the reading winding, does not exceed 6% of the propagation time of the signals at this winding.

It is clear that a second reading winding affecting the quadrants IG and SD could be formed with the configuration shown for the reading winding 12, by rotating the memory plane 10 through 90°. Likewise, the third reading winding affecting the quadrants SG and ID may be formed with the configuration shown for the reading winding 12 by again rotating the memory plane through 90°. This time, the outgoing and return wires will pass through all the remaining cores, i.e., the second half of the cores of these quadrants. Finally, the fourth reading winding which again affects the quadrants IG and SD may be formed in the same way, by imparting a final rotation of 90° to the memory plane.

It will be readily appreciated that, since a reading winding passes through one half of the cores of a given quadrant and one half of the cores of the diagonally opposed quadrant, all the noise signals generated in one of the quadrants is divided by a factor 2.

In the case of the present example, instead of the reading winding passing through 30 semiselected cores at the concomitant energisation of an X wire and of a Y wire, it only passes through 15 of the disturbed cores, which results in a division by a factor 2 of the noise due to the variations of the X and Y currents. It will be observed that the advantages obtained are not offset by a more complicated threading, since on the contrary the four reading windings may be identical.

It is also possible to divide by a factor 2 the amplitude of the noises due to the coupling of a reading winding to one of the inhibiting windings or Z windings, by giving the latter a particular configuration. It is merely necessary for each Z winding to extend through the cores of two non-diagonally disposed quadrants. A number of solutions are possible, all of which are equivalent from the viewpoint of desirable reduction of noise. These solutions will be examined with reference to FIGURES 2, 3 and 4.

In these figures, the quadrants SG, SD, IG and ID are symbolically represented by chain lines. In each figure, there are four Z windings Z1, Z2, Z3 and Z4. Their wires all extend through the cores of two adjacent quadrants. It must be noted that, in one memory plane out of two, the wires of the Z windings are horizontal, i.e. parallel to the Y wires, as illustrated in the figures, but in the other memory planes the wires of the Z windings must be vertical, i.e. parallel to the X wires, in order that the capacitive load which they represent may be alternately distributed between the Y wires and the X wires.

In FIGURE 2, in accordance with the first solution, each of the Z wires occupies a separate zone equal to one quarter of the plane. For example, the winding Z1 extends between the terminals Z1A and Z1B, along successive outgoing and return paths in two neighboring rows of cores. The inhibiting current is assumed to enter by way of a terminal such as Z1A and to leave by way of a terminal such as Z1B.

It will be seen that each Z winding covers only one half of the height of a quadrant. This solution is obviously the most advantageous from the viewpoint of the simplicity of the threading. However, it has the disadvantage that, considering all of the juxtaposed planes, the evolution of heat due to the ohmic resistance of the winding is maximum in a prismatic volume bounded by a surface equivalent to one quarter of the surface of a quadrant.

In accordance with FIGURE 3, the Z windings are interlaced in pairs. Thus, the windings Z1 and Z2 cover the quadrants SG and SD, while the windings Z3 and Z4 cover the quadrants IG and ID. Considering the winding Z1, one end extends from the terminal Z1B and describes one outgoing and return path on a first pair of rows. Thereafter, the wire jumps a succeeding pair of rows before describing a further outgoing and return path, and so on. This solution is accompanied by a slight complication of the threading, but it has the advantage that the zone of maximum heat evolution now extends substantially over the surface of a quadrant, considering all of the neighboring memory planes.

In accordance with FIGURE 4, the Z windings are interlaced or lapped one within the other over all the four quadrants. For example, in the winding Z1, the end extending from the terminal Z1A describes one outgoing and return path over a first pair of rows. Thereafter, the wire jumps three succeeding pairs of rows before describing a further outgoing and return path, and so on. This solution is accompanied by a distinctly greater complication of the threading, but it has the advantage that the evolution of heat is distributed over the whole of the surface of the memory plane.

Finally, it may be considered that it is the second solution, illustrated in FIGURE 3, which affords the most advantageous compromise in practice.

Referring again to FIGURE 1B, it will be observed that the reading winding 12 has one particular feature, namely that the "outgoing" wire 17 extends from the right-hand vertical side of the quadrant ID (terminal 13A), while the "return" wire 22 extends in the opposite sense and from the lower side of this same quadrant. There exists the possibility of making the outgoing and return wires 17 and 22 extend in the same sense, i.e. from the same side of the quadrant. Only the crossing points of the loops formed by the wires 17 and 22, and naturally by the wires 19 and 20 of the quadrant SG (FIGURE 1A), would be modified.

However, it is the mode of threading illustrated in the drawing which affords an appreciable advantage in regard to the "draughtboard code." By this latter expression is meant the configuration of the polarities of the reading signals available at the output terminals of the reading winding. It is known that there is obtained at a given output terminal of the reading winding a positive or negative voltage pulse depending upon the position of the selected core whose magnetisation is reversed in the reading phase of the memory cycle. The advantage of the threading mode adopted is that the draughtboard code is retained absolutely without change for the four quadrants of a memory plane, despite the rotations of the reading windings through 90°.

The result is in fact obtained that, with the exception of the cores situated on the edges of the quadrants, each square of a draughtboard comprises 16 cores. In one type of square, there are four cores at the centre which generate positive reading pulses, surrounded by 12 cores which generate negative reading pulses, and in the other type of square, there are four cores at the centre generating negative reading pulses surrounded by 12 cores generating positive reading pulses. The arrangement adopted is interesting in that it simplifies the loading of the memory planes when a test programme of the memory system is carried out.

The application of the invention involves no great complication of the necessary addressing for selecting one of the four reading windings, at the level of the preamplifiers or reading amplifiers, as a function of the position of the selected core during the reading. In addition to the binary digit of the heaviest weights of the addresses X and Y normally necessary for the selection in accordance with the desired quadrant, it is sufficient to use a binary digit of the lightest weights of these same addresses.

While in the case of a memory matrix of 128 x 128 divided into four quadrants of 64 x 64 each reading winding would possess 126 couplings to any pair of simultaneously energised X and Y wires, the number of such couplings is only 62 when the basic principles of the invention are applied. In addition, while there were previously 4,096 undesirable couplings between a reading winding and a corresponding Z winding, there are now only 1,024 such couplings between a reading winding and any one of the four Z windings.

Reference will be made to FIGURE 1A to indicate a possible modification of the structure of the reading winding. This modification consists in omitting the junction wire 23 and connecting to earth each of the terminals 16*a* and 16R through a resistance of equal value to the characteristic impedance of the reading winding. By this known connection, a signal noise generated at the "outgoing" wire would be prevented from being also propagated along the "return" wire and vice versa, but this would obviously be at the cost of a certain reduction of the amplitude of the useful output signals.

Further modifications and adaptations would obviously be within the ability of the person skilled in the art without departing from the scope of the invention.

What is claimed is:

1. A memory plane for constituting a tri-dimensional matrix store, comprising a plurality of bistable magnetic cores arrayed in at least four equal square sections or quadrants, a number of X windings and a number of Y windings threading columns and rows of said cores for coincident current selection of the latter, and four separate sense windings, characterized in that in each of said sense windings, an "outgoing" conductor and a "return" conductor are both threaded parallel to each other in the bifilar mode into only half the cores of one pair of diagonally opposed quadrants of cores, both said conductors having each a first portion which is zigzag threaded along a first diagonal direction in a first quadrant of said pair and both said conductors having each a second portion which is zigzag threaded along a second diagonal direction in the second quadrant of said pair, said first and second diagonal directions being transverse to one another.

2. A memory plane as claimed in claim 1, wherein an extremity of said outgoing conductor starts threading at a corner of a core quadrant and from one side thereof, and the corresponding extremity of said return conductor starts threading at the same corner of said quadrannt and from another side thereof.

3. A memory plane as claimed in claim 2, comprising four inhibit, or Z windings, each Z winding being threaded in a quarter of the total number of said magnetic cores, in such a manner that its conductor runs in one sense through the same row (or column) in the cores pertaining to a pair of non-diagonally disposed quadrants, and then in the opposite sense through the cores of the aadjacent row (or column).

4. A memory plane as claimed in claim 3, wherein each of said Z windings threads adjacent pairs of rows (or columns) of cores in two adjacent ones of said quadrants.

5. A memory plane as claimed in claim 3, wherein each of said Z windings threads every second pair of rows (or columns) of cores in two adjacent ones of said quadrants.

6. A memory plane as claimed in claim 3, wherein said Z windings are lapped in such a manner that each of said Z windings threads every four pair of rows (or columns) of cores pertaining to said four quadrants.

References Cited

UNITED STATES PATENTS 3,161,860 12/1964 Grooteboer ---------- 340—174

BERNARD KONICK, Primary Examiner

S. B. POKOTILOW, Assistant Examiner